United States Patent [19]
Kagata

[11] 3,827,524
[45] Aug. 6, 1974

[54] FREE WHEEL LOCKING MECHANISM
[75] Inventor: Tooru Kagata, Toyota, Japan
[73] Assignee: Aisin Seiki Kabushiki Kaisha, Kariya City, Aichi Pref., Japan
[22] Filed: Nov. 3, 1972
[21] Appl. No.: 303,363

[30] Foreign Application Priority Data
Nov. 29, 1971 Japan.............................. 46-112081

[52] U.S. Cl. .................................. 180/70, 192/47
[51] Int. Cl............................................. B60k 25/00
[58] Field of Search ..... 192/47; 180/70, 76, 44 R X

[56] References Cited
UNITED STATES PATENTS

| | | | |
|---|---|---|---|
| 846,178 | 3/1907 | Avery | 192/47 |
| 861,366 | 7/1907 | Jahn | 192/47 |
| 982,501 | 1/1911 | Ish | 180/44 R X |
| 1,565,377 | 12/1925 | Lindgren | 192/47 |
| 1,729,376 | 9/1929 | Fay | 192/47 |
| 1,823,113 | 9/1931 | Miller | 192/47 |
| 1,867,938 | 7/1932 | Dalton | 192/47 X |
| 1,924,723 | 8/1933 | Nowak | 192/47 X |
| 2,269,965 | 1/1942 | Wemp | 192/47 |
| 2,299,739 | 10/1942 | Colucci | 192/47 |
| 3,058,437 | 10/1962 | Iida | 192/47 |

FOREIGN PATENTS OR APPLICATIONS
778,971   7/1957   Great Britain ...................... 180/76

*Primary Examiner*—David Schonberg
*Assistant Examiner*—Terrance L. Siemens
*Attorney, Agent, or Firm*—Pierce, Scheffler & Parker

[57] ABSTRACT

A free wheel locking mechanism for a vehicle comprising, an axle shaft mechanically connected to an engine of the vehicle, a drive member connected to the axle shaft and rotatable thereby, a non-drive member operatively connected to the wheels of the vehicle so as to rotate therewith, means for selectively transmitting the driving force from the engine to the axle shaft, frictional means disposed between the drive member and the non-drive member, the frictional means being automatically and frictionally engaged with the non-drive member or automatically disengaged from the non-drive member according to the control of the driving force being transmitted to the axle shaft, and manual operating means independently manually controlling the connection between the non-drive member and frictional means, whereby the automatic operation is normally attained by frictional means, and the manual operation is independently attained by manual operating means when engine braking of four wheels is needed.

4 Claims, 5 Drawing Figures

3,827,524

FREE WHEEL LOCKING MECHANISM

BACKGROUND OF THE INVENTION

The present invention relates to a free wheel locking mechanism, especially adapted for use on automotive vehicles and capable of operating automatically and manually.

Conventionally, when the front wheels of a vehicle are not driven, that is, when only the rear wheels are driven, a system driven by the front wheels including a drive shaft and a differential gear, etc. could be provided but resulted in a driving loss and noises, and was also disadvantageous as regards wear, weight and costs. Also in a conventional manual type an operator must get off the vehicle every time to operate same, so that it was very troublesome, while with a conventional automatic type this was avoided, but had the further disadvantage in which engine braking of all wheels was not obtained when the vehicle ran down a steep slope.

SUMMARY OF THE INVENTION

Therefore, it is an object of the present invention to provide an improved free wheel locking mechanism for obviating the above mentioned various drawbacks.

It is another object of the present invention to provide an improved free wheel locking mechanism wherein power control is normally automatically carried out.

It is a further object of the present invention to provide an improved free wheel locking mechanism wherein the manual operation is possible and the four wheel braking is attained when the engine braking of the four wheels is needed.

BRIEF DESCRIPTION OF THE DRAWINGS

These and further objects, features and attendant advantages of the present invention will be more fully appreciated as the same becomes better understood from the following detailed description when considered in connection with the accompanying drawings wherein.

DETAILED DESCRIPTION OF THE INVENTION

Figure 1:
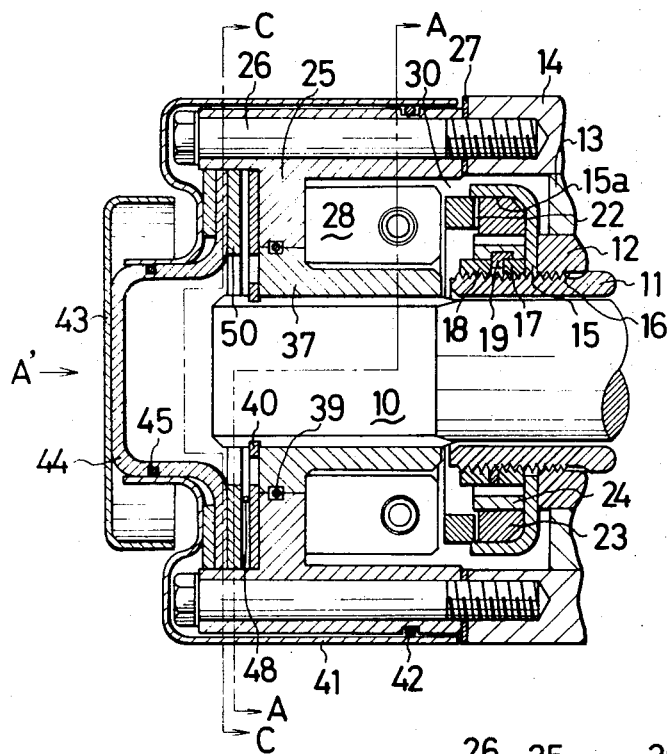
FIG. 1 is a cross sectional view of one embodiment of the invention.
Figure 3:
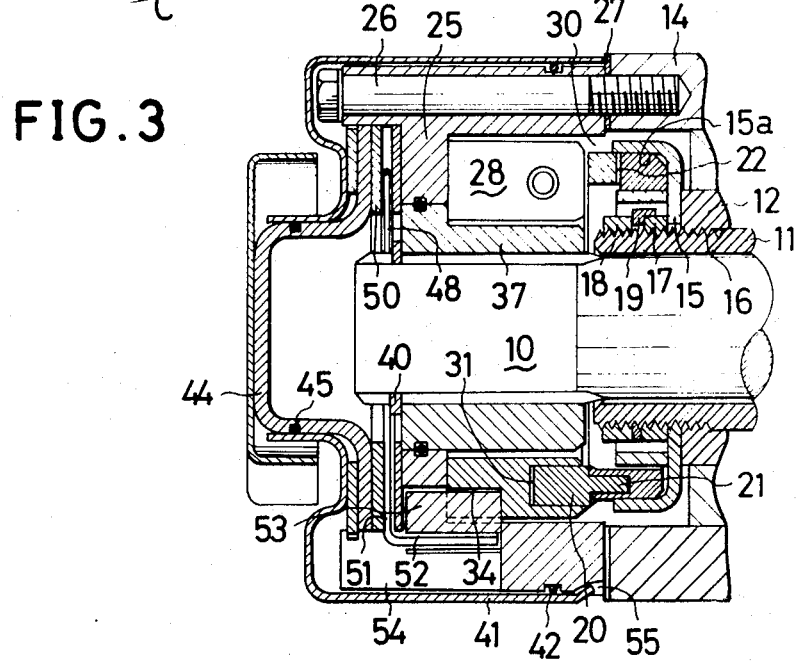
FIG. 3 is a section taken along the line B—B of FIG. 2.

Referring now to FIGS. 1, 2, 3, 4 and 5, the construction of the free wheel locking mechanism showing one embodiment of the present invention will be explained as follows;

The reference numeral 10 represents an axle shaft and a spindle 11 is coaxially located with the axle shaft 10 and independent thereof and a case 12 is coaxially positioned with and supported on the spindle 11. A bearing 13 or a hub 14 supported by the case 12 are rotatable with a vehicle wheel, not shown. A race member 15 is screwed onto a portion 16 provided on the spindle 11 and nuts 17, 18 are provided for preventing the race 15 from loosening and rotating, and a plate 19 is inserted between the nuts 17, 18. A pin 20 is fixedly mounted on one end of a cage 21 secured to the inner side of the race member 15 and a groove 22 is provided on the other portion thereof. A block 23 is inserted into the groove 22 and is outwardly pressed by a circular spring 24 and is pressed against the inner circumferential face 15a of the race member 15. That is to say, a kind of clutch member is formed by the block 23 and the race member 15, and the frictional resistance is applied to the cage 21. A body 25 is fixedly attached to the hub 14 by bolts 26 and a gasket 27 for preventing the entry of water between the body 25 and the hub 14.

A pair of pieces 28, 29 are provided in a space 30 provided in the body 25 and have a hole 31 into which the pin 20 fixed to the cage 21 is inserted so that the pieces 28, 29 are swingingly movable about the pin 20. A hole 32 is provided in the pieces 28, 29 for accommodating a return spring 33 therein. A groove 34 is formed on the outer circumference of the pieces 28, 29 and a cam portion 35 is provided on the inner circumference thereof. A notched portion 36 is provided on the outer circumference of an inner member 37 having a inner spline 38 for spline engagement with the axle shaft 10. A ring 39 is mounted between the sliding portion of the inner member 37 and the body 25 for limiting movement therebetween in the axial direction. A snap ring 40 is fixed to the axle shaft 10 for preventing the axle shaft 10 from moving in the right direction in FIG. 1. A cover 41 is provided on the outer circumference of the body 25 and an O-ring 42 is inserted between the body 25 and the cover 41.

A knob 43 and handle 44 internally engages the inner circumference of the cover 41 and an O-ring 45 is provided between the cover 41 and the handle 44. The numeral 46 is a spiral groove provided in the handle 44 and a roller 47 is located therein. One end of a spring 48 is connected to the roller 47. This roller 47 is situated in the groove 46 and also in the inner portion of radial groove 49 provided on a plate 50. By the rotation of the handle 44, the roller 47 is slidable between the grooves 46, 49 and is moved radially within the groove 49. The other end 51 of the spring 48 is inserted into a hole 52 provided in a block 53. The block 53 is slidable within a groove 54 formed in the body 25, and the body 25 and pieces 28, 29 are interconnected by the block 53. One portion of the cover 41 is bent engage a notch 55 provided on the outer circumference of the body 25 for preventing relative axial and rotational movement.

Figure 4:
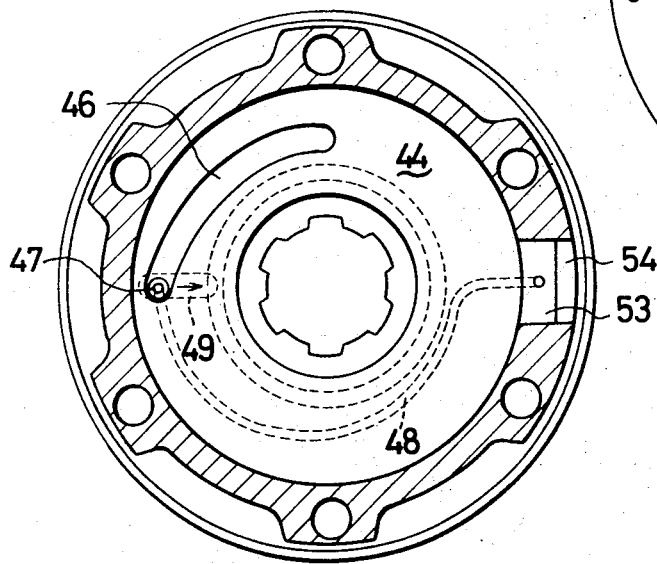
FIG. 4 is a section taken along the line C—C of FIG. 1.

In operation, the knob 43 is rotated in a counter clockwise direction for normal running and then the roller 47 is moved rightwardly as seen in FIG. 4 and the block 53 is moved rightwardly by the spring 48 and the block 53 is thus released from the groove 34 provided on the pieces 28, 29, and the connection between the pieces 28, 29 and the body 25 is released. Therefore, the body 25 may be rotated regardless of the inner member 37 and the pieces 28, 29 and the axle shaft 10 is not affected by the rotation of the wheel, not shown.

Figure 2:
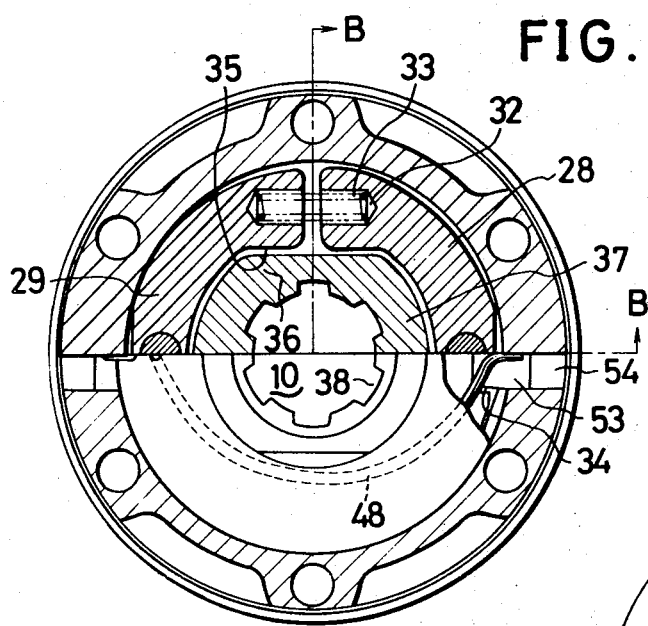
FIG. 2 is a section taken along the line A—A of FIG. 1.
Figure 5:
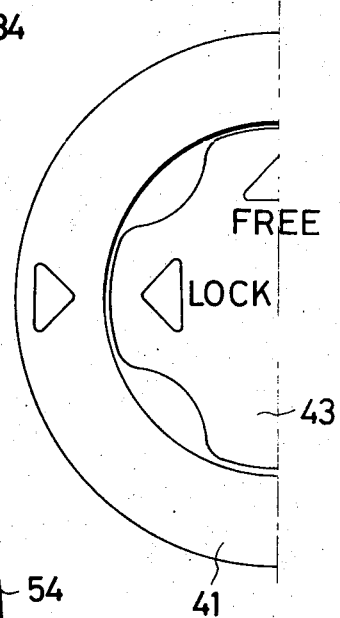
FIG. 5 is a view showing the parts in the direction of the arrow A' in FIG. 1.

However, when the block 53 as seen in FIG. 2 is manually operated and extends between the pieces 28, 29 and the body 25, the block 53 is connected with the pieces 28, 29 by the rotation of the inner member 37 and so that the axle shaft 10 and the wheel, not shown, are in a driving state.

When the vehicle is operated in the four wheel driving mode by the operator of the vehicle, that is to say, when the axle shaft 10 is driven by engine, not shown, the inner member 37 is rotated with the rotation of the axle shaft 10 and the notched portion 36 of the inner member 37 acts on the cam portion 35 of the pieces 28, 29 and at this time the pieces 28, 29 are swingingly moved about pin 20, and the rotation of pieces 28, 29 is so controlled by the frictional resistance produced on the cage 21 through the pin 20 that the pieces 28, 29 are outwardly pressed, respectively, and the body 25 is driven by the frictional torque occurring in the outer circumferential portion of the pieces 28, 29 and the inner circumferential portion of the body 25, so that the vehicle wheel, not shown, is driven. At this moment, the frictional torque produced on the outer circumferential portion of the pieces 28, 29 and the inner circumferential portion of the body 25 tends to extend the pieces 28, 29 further and a servo effect is attained. Since the pin 20 is the rotational center, only the shearing force of the frictional torque occurs on the cage 21.

Thus, the vehicle wheel is automatically driven by the rotation of the axle shaft 10, and when the driving torque is not transmitted to the axle shaft 10, the pieces 28, 29 are returned to the neutral position by the return spring 33 and then the vehicle wheel and the axle shaft 10 are separated. Accordingly, the axle shaft 10 holds the braking position.

Various other modifications and variations of the present invention are obviously possible in light of the above teachings. It is to be understood, therefore, that within the scope of the appended claims, the invention may be practiced otherwise than as specifically described herein.

Accordingly, what is claimed is:

1. A free wheel locking mechanism for a vehicle comprising:
    an axle shaft mechanically connected to an engine of the vehicle;
    an inner member connected to said axle shaft and rotatable thereby and formed with notched portions;
    a body member operatively connected to the wheels of said vehicle so as to rotate therewith;
    frictional means disposed between said inner member and said body member and comprising first and second pieces each of which includes cam portions engageable with the notched portions of said inner member when the driving force is transmitted from said engine to said axle shaft, said frictional means being automatically and frictionally engaged with said body member by rotating said inner member when said driving force is transmitted to said axle shaft and being automatically disengaged from said body member when said driving force to said axle shaft is interrupted;
    block means disposed between said first and second pieces and said body member and for integrally rotating said axle shaft and said body member; and
    manual operating means independently controlling the connection between said body member and said frictional means.

2. A free wheel locking mechanism as claimed in claim 1 and further comprising
    spring means inserted between said first and second pieces for biasing said first and second pieces into a neutral position.

3. A free wheel locking mechanism as claimed in claim 1 wherein said manual operating means comprises:
    a handle having a spiral passage;
    a roller slidably located in said spiral passage and a groove provided on a plate;
    a block slidably disposed within a groove provided on said body member, and engaging and disengaging said body member and said frictional means; and
    spring means disposed between said plate and block, one end of said spring contacting said roller and the other end thereof being inserted into a hole provided in said block.

4. A free wheel locking mechanism as claimed in claim 1, further comprising;
    a clutch assembly disposed between said axle shaft and said body member; and
    connecting means for connecting said first and second pieces to said clutch assembly.

* * * * *